March 23, 1954
N. STEVENS
2,673,002
HOLE SEALING DEVICE
Filed Dec. 19, 1950
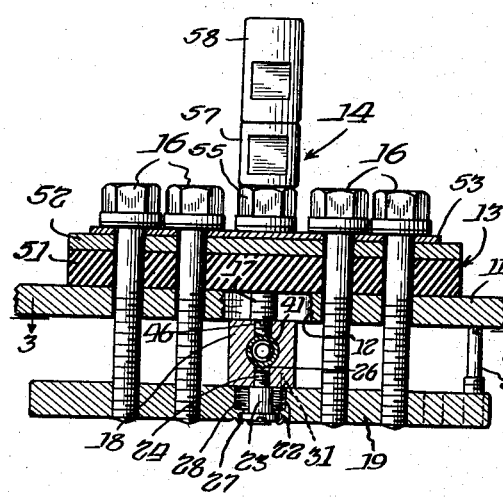
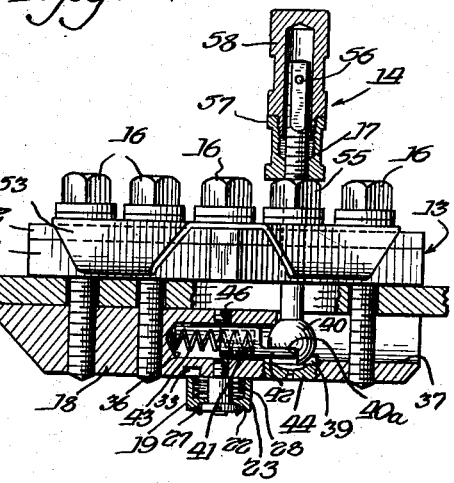
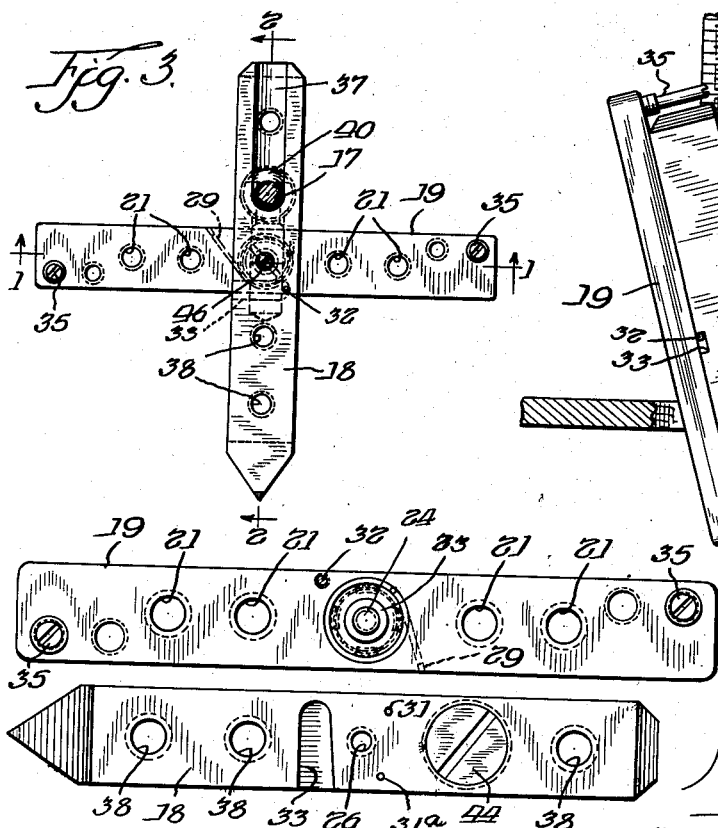
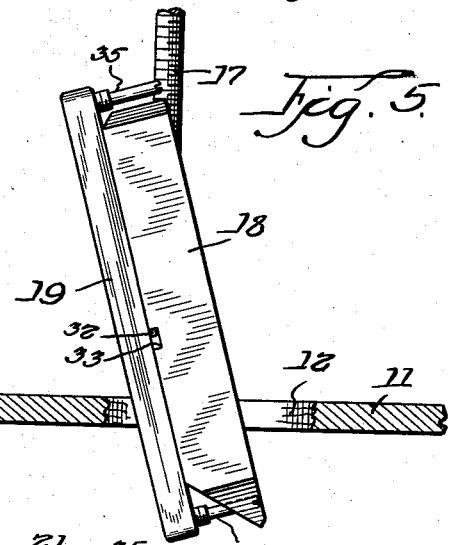
Inventor:
Nichols Stevens.

Patented Mar. 23, 1954

2,673,002

UNITED STATES PATENT OFFICE 2,673,002

HOLE SEALING DEVICE

Nichols Stevens, Chicago, Ill.

Application December 19, 1950, Serial No. 201,635

14 Claims. (Cl. 220—25)

The present invention relates to a hole sealing device, and more particularly the invention relates to a hole sealing device for use in closing a hole in a wall structure having one side which is inaccessible.

With the relatively high pressures used today in boilers, liquid transfer mains, and other similar apparatus, wherein one side of the wall structure is inaccessible, a slight hole or rupture in the wall structure has heretofore meant either a major repair job requiring substantial rebuilding of the wall structure, or complete discard of the ruptured portion. As either one of these measures involves considerable expense and a great deal of wastage, there is a great need for some means for quickly patching up the ruptured wall structure of such apparatus.

It is therefore one object of the present invention to provide a hole sealing device having a novel toggle bolt assembly which facilitates mounting of the device on a ruptured wall structure having one side which is inaccessible.

Another object of the invention is to provide a hole sealing device which is designed to supply additional support on the inaccessible side of a ruptured wall section, whereby enlargement of the rupture in the wall section due to the sides thereof being pushed out is prevented.

A further object of the invention is to provide a novel hole sealing device which allows for the use of a plurality of fastening bolts for drawing the sealing device up tightly over a hole or rupture in a wall structure.

A still further object of the invention is to provide a hole sealing device having a novel hole sealing gasket construction.

A feature of the invention is the provision of a hole sealing device including a novel toggle bolt assembly having an attaching stem and relatively movable crossarm means for engaging the inaccessible surface of a wall structure having one of its sides inaccessible, the crossarm means being adapted to engage the surface of the inaccessible side at more than two diametrically opposed points.

Another feature of the invention is the provision of a hole sealing device having a novel toggle bolt assembly including an attaching stem and at least two relatively movable, transversely disposed crossarm means for engaging a surface, the crossarm means being disposed transversely relative to each other and to the longitudinal axis of the attaching stem.

Still another feature of the invention is the provision of a hole sealing device having a novel hole sealing gasket structure including a relatively thick matting of resilient material, a rigid supporting plate backing the resilient material, and a relatively thin bendable sheet disposed over the backing plate, and bent over the edges thereof for gripping the resilient matting to hold the same in assembled relation with the backing plate, the structure thus composed having a plurality of bolt receiving apertures therein.

Other objects, features, and many of the attendant advantages of this invention will become better understood upon a reading of the following written description when considered in connection with the accompanying drawings, wherein:

Fig. 1 is a cross sectional view, partly in elevation, of the novel hole sealing device comprising the invention, showing the same mounted on a ruptured wall section;

Fig. 2 is a sectional view, partly in elevation, of the hole sealing device taken through plane 2—2 of Fig. 3;

Fig. 3 is a cross sectional view taken through plane 3—3 of the device in Fig. 1, and showing the construction of the crossarm means or members comprising a portion of the hole sealing device;

Fig. 4 is a plan elevational view showing the construction of the crossarm members illustrated in Fig. 3; and Fig. 5 is a side elevational view of the toggle bolt assembly comprising a part of the invention, and showing the same in a compressed condition.

In practicing the invention, a hole sealing device is provided which includes a novel toggle bolt assembly and a novel sealing gasket structure. The toggle bolt assembly comprises an attaching stem having a head portion, a first crossarm means operatively connected to the head portion of the attaching stem, and having means disposed therein for normally biasing the first crossarm means to assume a position transverse to the longitudinal axis of the attaching stem. The toggle bolt assembly also includes a second cross arm means operatively related to the first crossarm means, and having means mounted thereon for normally biasing the second crossarm means to assume a position substantially transverse to the longitudinal axes of the first crossarm means and the attaching stem. The crossarm means have a plurality of apertures therein adapted to co-operate with a plurality of apertures in a novel sealing gasket structure for receiving a plurality of tightening bolts used in holding the toggle bolt assembly and sealing gasket in position over a hole. The gasket structure includes a matting of resilient material mounted on a rigid supporting back plate, and held in assembled relation with the back plate by means of a bendable sheet of material disposed over the back plate and bent to grip the matting or resilient material.

Referring now to Fig. 1 of the drawings, a ruptured wall structure is shown at 11 having a hole 12 therein closed by a novel hole sealing device including a sealing gasket structure 13 held in place by a toggle bolt assembly, indicated at 14, and a plurality of tightening bolts 16. The wall structure 11 may be a side of a boiler, a liquid transfer main, or some other similar apparatus wherein one side of the wall structure is inaccessible, and wherein a relatively high pressure may be acting on the inaccessible side.

As is best shown in Fig. 2, the novel toggle bolt assembly includes a toggle bolt subassembly having an attaching stem 17, and a first crossarm means comprising a member 18, the toggle bolt subassembly having a construction similar in many respects to the toggle bolt assembly of the hole sealing device disclosed in my co-pending application Serial No. 607,165, filed July 26, 1945, now U. S. Patent No. 2,540,145, granted February 6, 1951. The first crossarm means is normally biased to a position transverse to the longitudinal axis of the attaching stem, and has a second crossarm means operatively related thereto. The second crossarm means is normally biased, by means hereinafter disclosed, to a position transverse to the longitudinal axis of both the first crossarm means and the attaching stem 17 in the manner shown in Fig. 3 of the drawings.

Adverting to Fig. 4, the second crossarm means comprises an elongated rectangular member 19 which may be molded or machined out of steel, and has a plurality of threaded bolt receiving apertures 21 formed along its length. As is best seen in Fig. 1 of the drawings, member 19 has a centrally disposed cylindrical cavity 22 formed therein accommodating a removable pivot post 23. Pivot post 23 has a reduced diameter, threaded end portion 24 adapted to engage a complementary threaded aperture 26 in first crossarm member 18, and is preferably held in assembled relation with second crossarm member 19 by some attaching means, such as the crimping shown at 27 in Fig. 1. Disposed in cavity 22, and surrounding pivot post 23, is a coiled tension spring 28. As is best shown in Fig. 4, tension spring 28 has one end thereof secured in a transversely running aperture 29 in second crossarm member 19, and has the other end thereof bent normally to the plane of its coils and adapted to engage a second aperture 31 or 31a in first crossarm member 18 in the manner shown in Fig. 1. In assembling the toggle bolt, the exposed face shown in Fig. 4 of crossarm member 19 may be turned over and placed on the exposed face shown in Fig. 4 of crossarm 18, with the longitudinal axes of the members running parallel. At the same time the pivot post 23 will become inserted in threaded aperture 26, and the bent, normal end of coiled spring 28 will become inserted in aperture 31. Thereafter the crossarm member 18 is turned counterclockwise from its position shown in Fig. 3 of the drawings, tensioning coil spring 28, which then tends to return the crossarm 18 to a position of axial alignment with crossarm 19, or vice versa. To prevent this from happening, an adjustable guide pin 32 is provided on crossarm member 19, and a guide means comprising a guide slot 33 is formed on the side of crossarm member 18 adapted to complementally receive crossarm member 19. Guide pin 32 can be adjusted to protrude downwardly into guide slot 33, and when so adjusted, serves to restrain crossarm members 18 and 19 against the action of coil spring 28 in a position such that their longitudinal axes are transverse relative to each other. If desired, the two crossarm members can be so positioned that the turned-up end of coil tension spring 28 engages aperture 31a, and the above procedure subsequently followed. Should this be done, tension spring 28 is wound tighter by approximately a quarter turn, and consequently causes the crossarm members to act much faster when released from a compressed position. Because crossarm member 19 is mounted on cross arm member 18, means for transmitting strain to the ends of crossarm member 19 are provided. This means comprises an adjustable leg or post 35 mounted on each end of crossarm member 19. Posts 35 are offset to the side of the longitudinal centerline of crossarm member 19 so that they will not interfere with the above described pivotal movement of the two members. From the preceding description, it can be appreciated that a single structure is provided which includes a number of supporting elements held in assembled relation by reason of the crimping 27 on member 19. This structure is such that it can be easily mounted on a previously known toggle bolt subassembly to greatly improve the qualities thereof.

Crossarm member 18 is a generally rectangular bar, preferably of steel, and has an axial bore 36 formed therein communicating with a groove 37 formed in one side thereof, and a plurality of bolt receiving apertures 38 formed along its length. At the juncture of axial bore 36 and groove 37, indicated at 39, is a quasi-spherical seat formed for receiving the head portion 40 of attaching stem 17. The head portion of attaching stem 17 is quasi-spherically shaped with a shoulder 40a formed therein, and is positioned in the quasi-spherical seat 39 in such a manner that the shoulder 40a is accessible to the axial bore 36. Positioned in axial bore 36 is a slide member 41 having a stepped portion 42 biased into engagement with the shoulder 40a by means of a coiled compression spring 43 positioned in axial bore 36. Adjacent spherical seat 39, in the side of crossarm member 18 opposite groove 37, is an aperture which is sufficiently large to accommodate the spherical head portion 40 of attaching stem 17, and which is closed by a threaded cap member 44 having a concave face. In order to assemble the attaching stem 17 with crossarm member 18, slide member 41 is depressed against the action of coiled spring 43, and held in depressed position by means of an adjustable stop pin 46. Cap 44 is then removed, and the attaching stem inserted and positioned in the manner shown in Fig. 2. Upon release of the stop pin 46, the stepped portion 42 of slide member 41 is biased into engagement with the shoulder 40a in the spherical head portion 39 by biasing spring 43, and causes the attaching stem 17 and cross member 18 to assume positions such that their longitudinal axes are transverse to each other, and preferably form right angles.

Upon the novel toggle bolt assembly comprising attaching stem 17, first crossarm means 18 and second cross arm means 19 being assembled in the above described manner, the toggle bolt assembly can be compressed or relatively moved to the position shown in Fig. 5 of the drawings by rotating crossarm members 18 and 19 relative to each other so as to assume positions paralleling their longitudinal axes. This action serves to wind the coiled tension spring 28 even tighter so that the same tends to cause the crossarms to again assume the relative positions shown in Fig. 3. Attaching stem 17 is then compressed downwardly into the groove 37 against the action of coiled compression spring 43 so as to align its longitudinal axis with the longitudinal axes of crossarm member 18, thereby forming a compact structure that is easily inserted in a hole, such as 12, in the ruptured wall structure 11. Upon the crossarm means 18 and 19 clearing the inaccessible side of the wall structure, they are released, and biasing springs 28 and 43 then act in the above described manner to cause the two crossarm means to assume positions such that their longitudinal axes are transverse relative to each other, and relative to the longitudinal axis of the attaching stem 17. Because of the number thereof, it can be appreciated that the transversely disposed crossarm means provide additional support to the inaccessible side of the ruptured wall structure whereby enlargement of the rupture in the wall section is prevented. This result is achieved by reason of the fact that the area of the inaccessible surface between points of engagement of the crossarm means is reduced to a value such that any further tendency of the rupture to enlarge itself is prevented.

Having inserted the novel toggle bolt assembly in the ruptured wall structure in the above described manner, the sealing gasket structure 13 is then brought into position over the hole. The novel sealing gasket structure indicated at 13 includes a relatively thick matting 51 of resilient material, such as rubber or asbestos. Matting 51 is mounted on a rigid supporting plate 52 of steel, or the like, and is held in assembled relation with plate 52 by means of a bendable sheet of material 53 bent around the sides of plate 52, and gripping the matting 51, in the manner shown in Fig. 2. The gasket thus constructed has a plurality of bolt receiving apertures therein which are adapted to co-operate with the bolt receiving apertures in each of the cross-arm members 18 and 19, and so positioned that the matting material 13 disposed between adjacent apertures is sufficiently thick to withstand any tendency to be blown out. With this limitation only, the position of the various bolt receiving apertures in the gasket structure 13, as well as in the crossarm members 18 and 19, can be varied in order that the hole sealing device thus comprised can be used to close any size or shape hole. Further, the relative dimensions of the two crossarm members 18 and 19 may be varied so that the device can be used to close holes having elongated configurations, etc.

Having inserted the novel toggle bolt assembly in position and placed the novel gasket structure over the hole so as to close the same, a nut and washer 55 is threaded over attaching stem 17 so as to temporarily hold the sealing device in place. If necessary, holes may be tapped in the side of the wall structure for accommodating an additional number of tightening bolts 16, and the same inserted and drawn up so as to tightly secure the device over the hole. In most instances, however, only the number of tightening bolts 16 which can be accommodated by the original hole appearing in the wall structure are needed. Should it be necessary to cut additional holes for the tightening bolts, however, a small aperture 56, shown in Fig. 2 of the drawings, is formed in the end of attaching stem 17 so as to indicate the position of each of the crossarms after insertion. To assist in aligning the apertures in the crossarm members with the apertures in the gasket structure, the ends of the tightening bolts may be pointed. Thus, should the apertures be slightly misaligned, the tapered point will serve to draw the crossarm member apertures into alignment. It should be noted also that the attaching stem 17 is threaded throughout its entire length so that the toggle bolt assembly can be mounted on any thickness of wall section. Should the device be used on a relatively thin wall structure, such as is illustrated in the drawings, a two-part cap comprising elements 57 and 58 may be provided for protecting the unused threaded portion of attaching stem 17. Subsequently damage to the threading is thereby prevented so that the assembly can be easily removed at any time if desired. The cap is constructed in two parts, with the top or covering part threaded into the lower part so that the hole sealing device can be removed without danger to the toggle bolt assembly should the nut 55 tend to freeze in position. This result is obtained due to the fact that the upper portion of the cap can be removed by applying an unscrewing force between the two parts of the cap member only. After removal of the top of the cap portion, the bared end of attaching stem 17 may be gripped with a wrench, or the like, and a removing force applied to nut 55 without imparting any strain to the spherical head portion 40 and slide member 41.

From the foregoing description, it can be appreciated that the invention provides a novel hole sealing device which can be easily mounted on a ruptured wall structure, one side of which is inaccessible. The device includes a novel toggle bolt assembly which is designed in such manner that it provides considerable support to the inaccessible side of the wall structure, thereby preventing the rupture therein from being expanded. Additionally, the design of the toggle bolt assembly is such that a large number of tightening bolts can be used in drawing the device up against a ruptured wall structure so that a considerably tighter seal over the rupture can be achieved. These features, in addition to its novel sealing gasket construction, allows the device to be used to close a hole in a wall structure normally containing or resisting relatively high pressures. It is of course apparent that, if so desired, only the toggle bolt subassembly comprising attaching stem 17 and crossarm means 18 can be used to retain the hole sealing device in place in the manner described in the above identified patent application; however, both crossarm means 18 and 19 are preferably used.

Having thus described my invention, it is obvious that various immaterial modifications may be made in the same without departing from the spirit of my invention; hence I do not wish to be understood as limiting myself to the exact form, construction, arrangement and combination of parts herein shown and described, and uses mentioned.

What I claim as new and desire to secure by Letters Patent is:

1. A toggle bolt assembly including an attaching stem, first cross arm means for engaging a surface operatively connected to said attaching stem and rotatable with respect thereto in a first plane containing the longitudinal axis of said stem, second cross arm means for engaging a surface operatively connected to said attaching stem and rotatable with respect thereto in a second plane normal to the longitudinal axis of said stem, and said second cross-arm means pivotally mounted to said first cross-arm means on an axis laterally of the axis of the attaching stem and parallel thereto when the attaching stem and second cross-arm means are normal to each other.

2. A toggle bolt assembly including an attaching stem, first cross arm means for engaging a surface operatively connected to said attaching stem and rotatable with respect thereto in a first plane containing the longitudinal axis of said stem, and second cross arm means for engaging a surface operatively connected to said attaching stem and rotatable with respect thereto in a second plane normal to the longitudinal axis of said stem, first biasing means for rotating said stem and said first cross arm means relative to each other, first stop means resisting the action of said first biasing means for locating said first cross arm means in a position transverse to the longitudinal axis of said stem, second biasing means for rotating said second cross arm means relative to said first cross arm means and said stem, and second stop means resisting the action of said second biasing means for locating said second cross arm means in a position transverse to said first cross arm means and to the longitudinal axis of said stem.

3. A toggle bolt assembly having an attaching stem and at least two relatively movable cross arm members for engaging a surface, said cross-arm members pivotally mounted together, spring means normally biasing said cross-arm members and attaching stem in attached position transverse with respect to each other, and said members being automatically movable by the aforesaid spring means to positions transversely disposed with relation to each other and to the longitudinal axis of said attaching stem.

4. A toggle bolt assembly including in combination an attaching stem and first and second cross-arm means pivotally connected together, the first cross arm means operatively connected to said attaching stem, means normally biasing said first cross arm means to assume a position transverse to the longitudinal axis of said attaching stem, the second cross arm means operatively related to said first cross arm means to move in planes parallel to each other, said first and second cross-arm means pivotally connected together laterally of the connection of the first cross-arm means to the attaching stem, and means normally biasing said second cross arm means to assume a position substantially transverse to the longitudinal axis of said first cross arm means by pivoting about the connection between said first and second cross-arm means.

5. A hole sealing device including in combination a toggle bolt assembly comprising an attaching stem, first cross arm means operatively connected to said attaching stem, means normally biasing said first cross arm means to assume a position transverse to the longitudinal axis of said attaching stem, second cross arm means operatively related to said first cross arm means to rotate in planes parallel to each other about an axis parallel to the attaching stem, spring means operatively connecting said first and second cross arm means for normally biasing said second cross arm means to assume a position substantially transverse to the longitudinal axis of said first cross arm means, and sealing gasket means cooperating with said toggle bolt assembly and comprising a relatively thick mat of resilient material positioned over the face of a rigid backing plate.

6. A hole sealing device including in combination a toggle bolt assembly comprising an attaching stem, first cross arm means operatively connected to said attaching stem, means normally biasing said first cross arm means to assume a position transverse to the longitudinal axis of said attaching stem, second cross arm means operatively related to said first cross arm means to rotate in planes parallel to each other about an axis parallel to the attaching stem, spring means operatively connecting said first and second cross-arm means for normally biasing said second cross arm means to assume a position substantially transverse to the longitudinal axis of said first cross arm means, said first and second cross arm means having a plurality of bolt receiving apertures therein, and gasket sealing means operatively related to said toggle bolt assembly and having a plurality of bolt receiving apertures therein adapted to cooperate with the apertures in said cross arm means for receiving a plurality of tightening bolts.

7. A toggle bolt assembly including in combination a threaded attaching stem having a head portion, a first cross arm member having an axial bore therein and a longitudinal groove formed in one of the sides thereof, said attaching stem having the head portion thereof disposed in said groove and accessible to the bore in said member, biasing means disposed in the bore in said member and engaging the head portion of said attaching stem for normally biasing said cross arm member to a position transverse to the longitudinal axis of said attaching stem, a second cross arm member operatively connected to said cross arm member, and biasing means positioned on said second cross arm member and engaging said first cross arm member for normally biasing said second cross arm member to a position transverse to the longitudinal axis of said first cross arm member and said attaching stem.

8. A hole sealing device including in combination a toggle bolt assembly comprising a threaded attaching stem having a head portion, a first cross arm member having an axial bore therein and a longitudinal groove formed in one of the sides thereof, said attaching stem having the head portion thereof disposed in said groove and accessible to the bore in said member, biasing means disposed in the bore in said member and engaging the head portion of said attaching stem for normally biasing said cross arm member to a position transverse to the longitudinal axis of said attaching stem, a second cross arm member operatively connected to said cross arm member to rotate in planes parallel to each other about an axis parallel to the attaching stem, biasing means positioned on said second cross arm member and engaging said first cross arm member for normally biasing said second cross arm member to rotate to a position transverse to the longitudinal axis of said first cross arm member, said first and second cross arm members having a plurality of bolt receiving apertures spaced along the longitudinal axes thereof, and gasket sealing means operatively related to said toggle bolt assembly, said gasket sealing means comprising a relatively thick mat of resilient material, a rigid backing plate supporting said mat of resilient material, and a bendable sheet of material covering the remaining side of said rigid plate and bent around the edges thereof to grip said mat of resilient material, said gasket sealing means having a plurality of bolt receiving apertures therein adapted to cooperate with the apertures in said cross arm members for receiving a plurality of tightening bolts.

9. A hole sealing device including in combination a toggle bolt assembly comprising a threaded attaching stem having a head portion, a cross arm member having an axial bore therein and a longitudinal groove formed in one of the sides thereof, said attaching stem having the head portion thereof disposed in said groove and accessible to the bore in said member, biasing means disposed in the bore in said member and engaging the head portion of said attaching stem for normally biasing said cross-arm member to a position transverse to the longitudinal axis of said attaching stem, a second cross arm member operatively connected to said first-mentioned cross arm member, said cross-arm members having a plurality of bolt receiving apertures spaced along the longitudinal axis thereof, said cross-arm members including means for biasing said members to rotate in planes parallel to each other about an axis parallel to the attaching stem, and gasket sealing means operatively related to said toggle bolt assembly, said gasket sealing means comprising a relatively thick mat of resilient material, a rigid backing plate supporting said mat of resilient material, and a bendable sheet of material covering the remaining side of said rigid plate and bent around the edges thereof to grip said mat of resilient material, said gasket sealing means having a plurality of bolt receiving apertures therein adapted to cooperate with the apertures in said cross arm members for receiving a plurality of tightening bolts.

10. A hole sealing device including in combination a toggle bolt assembly comprising a threaded attaching stem having a quasi-spherical head portion with a shoulder therein, a first cross arm member having an axial bore therein communicating with a longitudinal groove formed in one side thereof, a quasi-spherical socket forming a seat for receiving the head portion of said attaching stem disposed in the groove in said first cross arm member at the point of juncture thereof with said axial bore, an aperture formed in said first cross arm member in the side thereof opposite said grooved side and disposed adjacent said quasi-spherical seat, said aperture being of a size to accommodate the spherical head portion of said attaching stem, an adjustable threaded cap member for closing said aperture and having an inner concave surface for supporting said quasi-spherical head portion, a slide member positioned in said axial bore and engaging said shoulder in the spherical head portion of said attaching stem, a compression spring disposed in said axial bore and engaging said slide member, said compression spring in conjunction with said slide member serving to bias said first cross arm member to a position transverse to the longitudinal axis of said attaching stem, an adjustable stop pin in said first cross arm member for retaining said slide member in a position out of engagement with said shoulder, a second cross arm member pivotally connected to said first cross arm member by an adjustable post, and having a cavity therein surrounding the said post means for retaining said adjustable post within said first cross arm member, and means for retaining said post in assembled relation with said second cross arm member, a coiled tension spring seated in said cavity, means securing one end of said spring to said second cross arm member, means securing the remaining end of said tension spring to said first cross arm member, an adjustable guide pin on said second cross arm member, means on said first cross arm member cooperating with said adjustable guide pin for retaining said second cross arm member in a position transverse to the longitudinal axis of said first cross arm member against the action of said tension spring, said first and second cross arm members having a plurality of bolt receiving apertures therein, and gasket sealing means operatively related to said toggle bolt assembly and having a plurality of bolt receiving apertures therein adapted to cooperate with the apertures in said cross arm members for receiving a plurality of tightening bolts.

11. A toggle bolt assembly including in combination a threaded attaching stem having a quasi-spherical head portion with a shoulder therein, a first cross arm member having an axial bore therein communicating with a longitudinal groove formed in one side thereof, a quasi-spherical socket forming a seat for receiving the head portion of said attaching stem disposed in the groove in said first cross arm member at the point of juncture thereof with said axial bore, an aperture formed in said first cross arm member in the side thereof opposite said grooved side and disposed adjacent said quasi-spherical seat, said aperture being of a size to accommodate the spherical head portion of said attaching stem, an adjustable threaded cap member for closing said aperture and having an inner concave surface for supporting said quasi-spherical head portion, a slide member positioned in said axial bore and engaging said shoulder in the spherical head portion of said attaching stem, a compression spring disposed in said axial bore and engaging said slide member, said compression spring in conjunction with said slide member serving to bias said first cross arm member to a position transverse to the longitudinal axis of said attaching stem, an adjustable stop pin in said first cross arm member for retaining said slide member in a position out of engagement with said shoulder, a second cross arm member pivotally connected to said first cross arm member by an adjustable post, and having a cavity therein surrounding the said post means for retaining said adjustable post within said first cross arm member, and means for retaining said post in assembled relation with said second cross arm member, a coiled tension spring seated in said cavity, means securing one end of said spring to said second cross arm member, means securing the remaining end of said tension spring to said first cross-arm member, an adjustable guide pin on said second cross-arm member, and means on said first cross-arm member cooperating with said adjustable guide pin for retaining said second cross-arm member in a position transverse to the longitudinal axis of said first cross-arm member against the action of said tension spring.

12. A toggle bolt assembly including in combination a threaded attaching stem having a quasi-spherical head portion with a shoulder therein, a first crossarm member having an axial bore therein communicating with a longitudinal groove formed in one side thereof, a quasi-spherical socket forming a seat for receiving the head portion of said attaching stem in the groove in said first crossarm member at the point of juncture thereof with said axial bore, an aperture formed in said first crossarm member in the side thereof opposite said grooved side and disposed adjacent said quasi-spherical seat, said aperture being of a size to accommodate the spherical head portion of said attaching stem, an adjustable threaded cap member for closing said aperture and having an inner concave surface for supporting said quasi-spherical head portion, a slide member positioned in said axial bore and engaging said shoulder in the spherical head portion of said attaching stem, a compression spring disposed in said axial bore and engaging said slide member, said compression spring in conjunction with said slide member serving to bias said first crossarm member to a position transverse to the longitudinal axis of said attaching stem, and a threaded, adjustable stop pin in said first crossarm member for retaining said slide member in a position out of engagement with said shoulder.

13. A hole sealing device including in combination a threaded attaching stem having a quasi-spherical head portion with a shoulder therein, a first crossarm member having an axial bore therein communicating with a longitudinal groove formed in one side thereof, a quasi-spherical socket forming a seat for receiving the head portion of said attaching stem in the groove in said first crossarm member at the point of juncture thereof with said axial bore, a slide member positioned in said axial bore and engaging said shoulder in the spherical head portion of said attaching stem, a compression spring disposed in said axial bore and engaging said slide member, said compression spring in conjunction with said slide member serving to bias said first crossarm member to a position transverse to the longitudinal axis of said attaching stem, a second crossarm member pivotally connected to said first crossarm member laterally of the connection of the attaching stem to the first cross-arm member, said first and second cross-arm members operatively mounted to rotate in planes parallel to each other about the connection, a coiled tension spring mounted on said second crossarm member, means securing one end of said spring to said second crossarm member, means securing the remaining end of said tension spring to said first crossarm member, and means for retaining said second crossarm member in a position transverse to the longitudinal axis of said first crossarm member against the action of said tension spring.

14. A sealing gasket structure for a hole sealing device including a toggle bolt assembly comprising an attaching stem, transversely arranged cross arms, and one or more bolts adapted to be affixed to the cross arms, said sealing gasket structure comprising a rigid supporting plate, said cross-arms being spring biased and operatively connected to rotate in planes parallel to each other to positions transverse to each other, a relatively thick matting of resilient material mounted on said rigid supporting plate, and a relatively thin, bendable sheet of material having a comparatively high tensile strength disposed over said rigid supporting plate and bent over the edges thereof for gripping the resilient matting to hold the same in assembled relation with the backing plate, the structure thus comprised having a plurality of bolt receiving apertures therein, one of said apertures adapted to receive the attaching stem, and the other apertures adapted to receive the aforesaid bolts for additionally securing the gasket structure to the hole sealing device.

NICHOLS STEVENS.

References Cited in the file of this patent

UNITED STATES PATENTS

| Number | Name | Date |
|---|---|---|
| 521,733 | Roe | June 19, 1894 |
| 632,540 | Sampson | Sept. 5, 1899 |
| 1,195,013 | Hieggby | Aug. 15, 1916 |
| 1,814,383 | Hadford | July 14, 1931 |
| 1,878,579 | Gober | Sept. 20, 1932 |
| 1,939,983 | Karitzky | Dec. 19, 1933 |
| 2,329,037 | Eisenberg | Sept. 7, 1943 |
| 2,400,614 | Vivian | May 21, 1946 |
| 2,408,366 | Boyer | Oct. 1, 1946 |
| 2,502,858 | Klix | Apr. 4, 1950 |
| 2,540,145 | Stevens | Feb. 6, 1951 |